UNITED STATES PATENT OFFICE 2,299,049

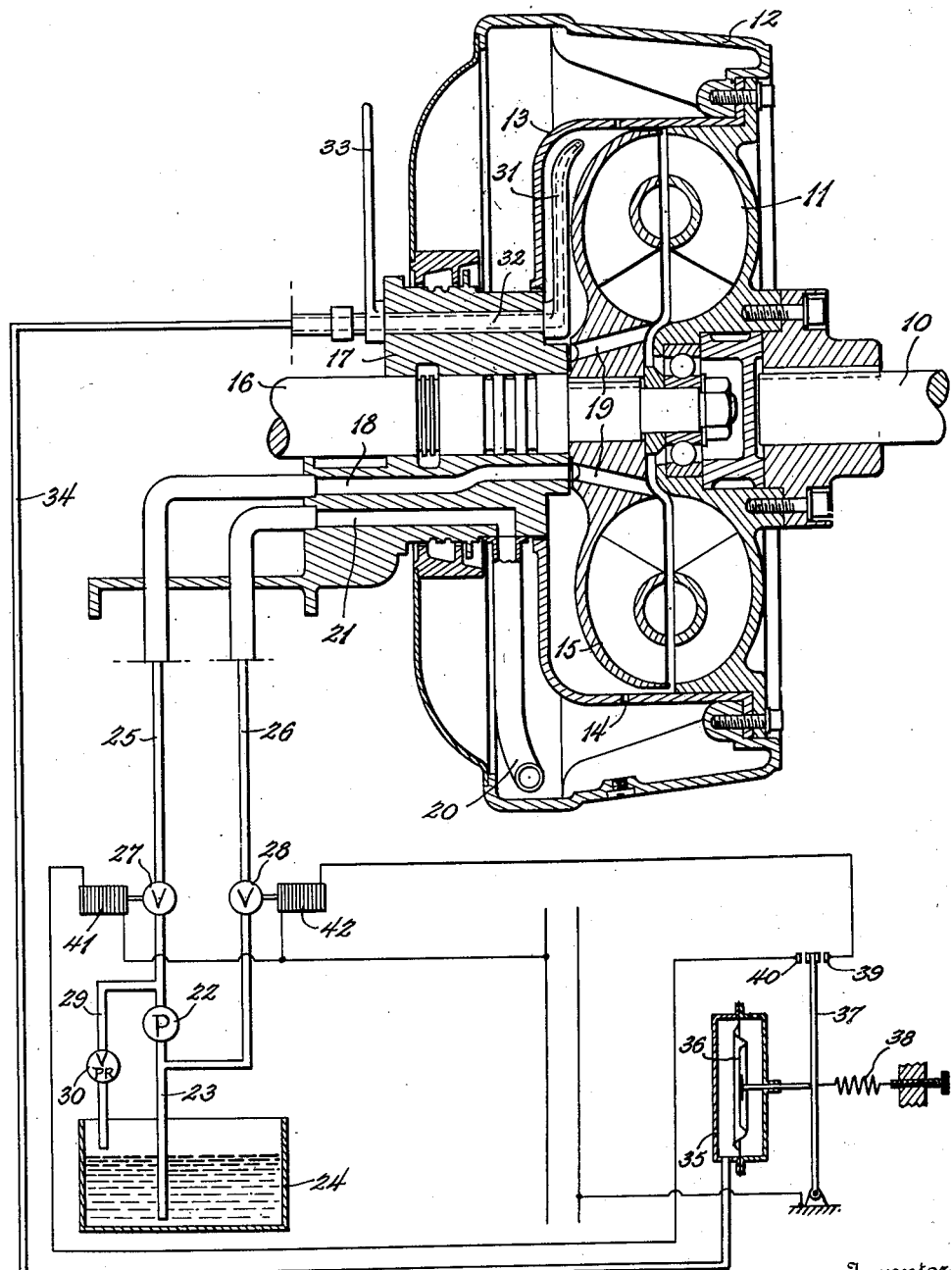

SCOOP TUBE CONTROL FOR HYDRAULIC COUPLINGS

Herbert Ziebolz, Chicago, Ill., assignor to Askania Regulator Company, Chicago, Ill., a corporation of Illinois Application September 26, 1940, Serial No. 358,560

8 Claims. (Cl. 60—54)

This invention relates to hydraulic couplings of the general type shown in U. S. Patents 2,116,992 and 2,202,243 and, among other objects, aims to provide an improved auxiliary scoop tube control, the main idea being to simplify the control of the scoop tube, to decrease the time necessary for speed changes and to avoid hunting in case of automatic control of the hydraulic coupling.

Patent No. 2,116,992 embodies a stationary scoop tube and an outside pump furnishing liquid to the hydraulic coupling or pumping it out of the coupling. The difficulty encountered in this design is that there is no indication of the amount of liquid in the coupling and therefore no indication of the amount of change in speed to be expected after controlling the supply or the return of the fluid. This is particularly objectionable in the case of the automatic controls which have to anticipate the speed change to avoid over-control or hunting. Patent No. 2,202,243 embodies an improvement, known as the variable scoop tube wherein the position of the scoop tube, which is operated from the outside is an indication of the oil level in the outer casing or reservoir of the coupling. This design is easier to control, because the scoop tube position is approximately an indication of the expected speed. However, it has the disadvantage of being comparatively slow in response to scoop tube position change, due to the absence of an auxiliary pump. The purpose of this invention is therefore to provide an improvement over a combination of both designs wherein a variable scoop tube is used in the inner casing of the coupling to control the oil level by controlling the operation of an auxiliary pump.

Other aims and advantages of the invention will appear in the specifiaction, when considered in connection with the accompanying drawing, wherein the figure is a vertical sectional view of a coupling and control system embodying the invention.

Referring particularly to the drawing, the coupling, there shown, is of the variable speed type embodying the usual driving shaft 10 carrying an impeller 11 to which is connected an outer reservoir casing 12 and an inner casing 13 having the usual orifices 14 or leak-off nozzles. A runner 15 is mounted within the inner casing on a driven shaft 16 journalled in a fixed bearing 17. Oil is supplied to the coupling through a conduit 18 in the bearing and an annular series of passageways 19 in the hub portion of the runner. Oil is removed from the outer casing 12 after passing through the orifices 14 by means of a stationary scoop tube 20 communicating with an outlet conduit 21, also in the bearing 17.

In this instance, oil is supplied to and returned from the coupling by a motor driven pump 22 conveniently, though not necessarily, of the constant delivery type having an intake pipe 23 extending into a tank or sump 24 and a delivery pipe 25 leading to the coupling through the conduit 18. A return pipe 26 leading from the conduit 21 is connected to the intake pipe 23 near the pump. The supply and return of oil are shown as being controlled by a valve 27 in the supply pipe 25 and a valve 28 in the return pipe 26. When the supply valve is closed, the pump returns oil to the tank through a by-pass pipe 29 having a pressure valve 30. This arrangement enables the pump to run continuously and eliminates the starting time required in a system using an intermittent pump.

In accordance with this invention, an adjustable scoop tube 31 within the inner casing 13 is employed to control the operation of the valves 27 and 28 and, consequently the oil level in the coupling. The scoop tube 31 is mounted on a rotatable pipe 32 extending through the bearing 17 and having an operating lever 33 which may be actuated either automatically or manually. In case of automatic control the position of the lever may be used for stabilizations of the control in the usual manner. The tube 31 communicates with a pipe 34 leading to a chamber 35 of a diaphragm relay having a diaphragm 36, which acts on a contact arm 37 in opposition to an adjustable spring 38. The contact arm controls circuits through contacts 40 and 39 to solenoids 41 and 42 which open the valves 27 and 28, respectively.

The position of the scoop tube 31 and its operating lever becomes an indication of and controls the oil level or depth of the annular oil ring in the working chamber and of the expected speed. In the position shown, the coupling is operating at minimum speed. To increase the speed the end of the scoop tube is brought closer to the axis of rotation of the coupling so that its scoop end is out of the oil, thus reducing the pressure on the diaphragm 36 and permitting the spring 38 to move the contact arm 37 to the left and energize the solenoid 41, which opens the supply valve 27. The oil is quickly supplied to the working chamber by the pump and the valve 27 will again close as soon as the oil level reaches the end of the scoop tube and the pressure restores the diaphragm relay to its neutral position. To decrease the speed, the end of the scoop tube is moved in an outward direction and thus immersed into the oil ring thereby increasing the pressure on the diaphragm 36 which then moves the arm 37 to the right and energizes the solenoid 42, thus opening the return valve 28. Then, the pump removes the excess oil from the outer casing until the receding level of the oil ring in the working chamber reaches the end of the scoop tube and the pressure on the diaphragm is reduced to normal, again restoring the relay to its neutral position, when the return valve 28 again closes. In this manner the speed of the coupling is easily regulated and changes in speed can be effected very quickly without hunting.

Obviously, the relay may be of the well known "Askania" hydraulic or fluid jet type. However, it is sometimes more convenient to use solenoid valves, because the pump 22 is usually driven by an electric motor and the source of current is easily available. It is also contemplated that the relay may be employed to control the operation of a reversible pump used in some types of couplings. In fact, the invention can be practiced in a number of ways which will be apparent to those skilled in the art.

Obviously, the present invention is not restricted to the particular embodiment thereof, herein shown and described.

What is claimed is:

1. In a hydraulic coupling of the character described having a working chamber, an oil supply and a stationary scoop tube for removing the oil; an adjustable scoop tube movable in the coupling to vary the effective position of the scoop end; means responsive to the pressure at the nozzle of the movable scoop tube as an indication of the oil level in the working chamber for controlling the oil level in the working chamber; and means to control the level of the oil in accordance with the position of the adjustable scoop tube.

2. In a hydraulic coupling of the character described having a stationary scoop tube for returning oil from the coupling and a supply conduit connected to supply oil to the working chamber; a pump connected to said stationary scoop tube and supply conduit; an adjustable scoop tube movable in the coupling to vary the effective position of the scoop end and communicating with the working chamber; and a pressure controlled relay responsive to the pressure at the nozzle of the adjustable scoop tube as an indication of the oil level in the working chamber and connected to control the supply of oil by the pump and the return of oil from the working chamber.

3. In a hydraulic coupling of the character described, an adjustable scoop tube communicating with the working chamber; an operating lever for adjusting the scoop tube in the working chamber to vary the effective position of the scoop end; means to supply oil to and remove it from the coupling; and a pressure responsive relay connected to the scoop tube and responsive to the pressure at the nozzle of the tube as an indication of the oil level in the working chamber to control said means and thereby the level of oil in the working chamber.

4. In a variable speed hydraulic coupling of the class described, means to supply oil to and return oil from the coupling; and an adjustable scoop tube movable in the working chamber to vary the effective position of the scoop end; and means connected to said tube to control said means and thereby vary the oil level in the working chamber and the degree of the coupling in response to changes in adjustment of the tube.

5. In a hydraulic coupling of the character described having a stationary scoop tube, an oil return conduit connected thereto and a supply conduit communicating with the working chamber, a constantly driven pump connected to both the return and supply conduits; solenoid-operated valves in the return and supply conduits; an adjustable scoop tube movable in the working chamber of the coupling to vary the radius of the scoop end from the axis of the coupling; means to operate said scoop tube; a pressure operated relay communicating with said adjustable scoop tube; and solenoid circuits controlled by the relay in response to changes in the adjustment of the scoop tube to operate the valves and control the oil level in the working chamber and the degree of the coupling.

6. In a hydraulic coupling of the character described having a working chamber, an oil supply and a stationary scoop tube for removing the oil; an adjustable scoop tube movable in the coupling to vary the effective position of the scoop end; and means responsive to the pressure at the nozzle of the movable scoop tube as an indication of the oil level in the working chamber to control the level of the oil in the working chamber in accordance with the position of the adjustable scoop tube.

7. In a hydraulic coupling according to claim 6, in which the means includes a pressure responsive relay and control valves for the supply and removal of the oil to and from the working chamber.

8. In a hydraulic coupling of the character described having a working chamber, an adjustable scoop tube movable in the chamber to vary the effective position of the scoop end; and means in communication with the tube and responsive to the pressure at the nozzle of the scoop tube to control the level of the oil in the working chamber in accordance with the position of the scoop tube.

HERBERT ZIEBOLZ.